(12) United States Patent
Samejima et al.

(10) Patent No.: US 7,299,613 B2
(45) Date of Patent: Nov. 27, 2007

(54) MULCHING MOWER UNIT

(75) Inventors: Kazuo Samejima, Sakai (JP); Masatoshi Yamaguchi, Sakai (JP); Junichi Kitamura, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/787,892

(22) Filed: Feb. 26, 2004

(65) Prior Publication Data

US 2004/0237492 A1 Dec. 2, 2004

(30) Foreign Application Priority Data

May 30, 2003 (JP) ............................. 2003-154569
May 30, 2003 (JP) ............................. 2003-154570

(51) Int. Cl.
*A01D 67/00* (2006.01)

(52) U.S. Cl. ............................ 56/320.1; 56/320.2; 56/6

(58) Field of Classification Search .............. 56/320.1, 56/320.2, 6, 13.5, 13.6, 17.4, 17.5, DIG. 22
See application file for complete search history.

(56) References Cited

U.S. PATENT DOCUMENTS

| 3,646,739 | A | * | 3/1972 | Dahl | 56/320.1 |
|---|---|---|---|---|---|
| 4,055,036 | A | * | 10/1977 | Kidd | 56/13.6 |
| 5,035,108 | A | * | 7/1991 | Meyer et al. | 56/13.4 |
| 5,210,998 | A | * | 5/1993 | Hojo et al. | 56/255 |
| 5,212,938 | A | * | 5/1993 | Zenner et al. | 56/320.1 |
| 5,267,429 | A | * | 12/1993 | Kettler et al. | 56/295 |
| 5,305,589 | A | * | 4/1994 | Rodriguez et al. | 56/320.1 |
| 5,465,564 | A | * | 11/1995 | Koehn et al. | 56/320.2 |
| 5,483,790 | A | * | 1/1996 | Kuhn et al. | 56/17.5 |
| 5,628,171 | A | * | 5/1997 | Stewart et al. | 56/320.2 |
| 5,987,863 | A | | 11/1999 | Busboom et al. | |
| 6,065,276 | A | * | 5/2000 | Hohnl et al. | 56/320.1 |
| 6,189,307 | B1 | * | 2/2001 | Buss et al. | 56/320.1 |
| 6,192,666 | B1 | * | 2/2001 | Sugden et al. | 56/320.2 |

* cited by examiner

*Primary Examiner*—Thomas B. Will
*Assistant Examiner*—Alicia Torres
(74) *Attorney, Agent, or Firm*—The Webb Law Firm

(57) ABSTRACT

A mulching mower unit comprising a mower deck having a top plate, and a plurality of rotary blades arranged side by side inside the mower deck. A mulching baffle for providing at least part of boundary walls of a plurality of mulching chambers is detachably attached to the interior of the mower deck. A vertical guide wall constituting the mulching baffle has an inclined surface. A terminal end guide surface is formed in a terminal end portion of the vertical guide wall with respect to a direction of rotation of the rotary blade in a region around an opening for allowing the adjacent mulching chambers to communicate with each other, whereby grass clippings are deflected inwardly of the mulching chamber with which the terminal end guide surface is associated.

18 Claims, 14 Drawing Sheets

MULCHING MOWER UNIT

BACKGROUND OF THE INVENTION

1. Field of the Invention

The present invention relates to a mower unit comprising a mower deck including a plurality of rotary blades arranged side by side, and a mulching baffle having a vertical guide wall defining at least part of a boundary wall of a mulching chamber for each rotary blade, wherein the mulching baffle is detachably installed in the interior of the mower deck thereby to allow a mulching operation to be carried out. This mower unit is also applicable, with removal of the mulching baffle, to a mowing operation carried out in a side-discharging mode where grass clippings cut by the rotary blades are collected and discharged from a discharge outlet formed in the mower deck.

2. Description of the Related Art

A conventional mower unit which is convertible between a normal discharging mode and a mulching mode is known from U.S. Pat. No. 5,987,863 in which independent mulching chambers are formed for respective rotary blades by utilizing a sheet-metal mulching baffle.

Another conventional mower unit is known from U.S. Pat. No. 5,628,171 in which mulching chambers are formed for respective rotary blades by utilizing a hollow block-like mulching baffle, the adjacent mulching chambers being allowed to communicate with each other through small openings formed in boundary regions thereof.

The mulching baffle for allowing a mulching operation includes a vertical guide wall having a partially arcuate configuration extending along a locus of rotation of each rotary blade in plan view in order to retain and re-cut grass clippings in each mulching chamber for each rotary blade. Each of the mulching baffles disclosed in the above U.S. patents includes a vertical guide wall having an upright wall surface, as a result of which grass clippings cut and thrown up from growing grass will swirl and travel along a rectangular corner space defined by the vertical guide wall of the mulching baffle and a deck top plate. This may cause the grass clippings to adhere to or remain in the rectangular corner space to deteriorate a mulching performance depending on the type of grass, length of grass, amount of grass reaped per unit time, moist state of grass, etc.

Further, with the mower unit according to U.S. Pat. No. 5,628,171 noted above, since the adjacent mulching chambers communicate with each other through the small opening in the boundary region thereof, the grass clippings would flow from one to the other of the mulching chambers. This may cause a problem of deteriorating the mulching performance.

SUMMARY OF THE INVENTION

The object of the present invention is to provide a mower unit allowing a mulching operation to be carried out with excellent mulching performance and excellent mulching efficiency by improving a mulching baffle. Also, a mower unit arrangement for facilitating removal of a mulching baffle is proposed.

In order to fulfill the above-noted object, a mower unit according to the present invention comprises a mower deck having a top plate, a plurality of rotary blades arranged side by side inside the mower deck, a mulching baffle defined to correspond to loci of rotation of the respective rotary blades inside the mower deck to produce at least part of boundary walls of a plurality of mulching chambers, the mulching baffle being detachably attached to the mower deck, a vertical guide wall constituting the mulching baffle and directly opposed to the loci of rotation of the respective rotary blades, the guide wall having an inclined surface extending progressively upward toward the deck top plate and inward toward the center of rotation of each blade, an opening for allowing the adjacent mulching chambers to communicate with each other, and a terminal end guide surface formed in a terminal end portion of the vertical guide wall with respect to a direction of rotation of the rotary blade in a region around the opening, whereby grass clippings are deflected inwardly of the mulching chamber with which the terminal end guide surface is associated.

In the mower unit having the mulching baffle attached thereto as noted above, the grass clippings cut and bounced off by the rotary blade will swirl and flow along the vertical guide wall in each partitioned mulching chamber. In this case, the swirling and flowing glass clippings are guided by the vertical guide wall to move toward the center of the mulching chamber as they are transported toward the deck top plate. Then, the clippings stall and drop to a blade operating area by gravity to undergo cutting operations again. By repeating this process, the grass clippings are chopped and deposited on the running track of the mower. Further, the grass clippings reaching the terminal end portion of the vertical guide wall with respect to the direction of rotation of the blade are guided inwardly of the mulching chamber or toward the rotary axis by the terminal end surface to be prevented from flowing through the opening in the boundary region into the adjacent mulching chamber.

Thus, the cut and bounced grass clippings are guided by the inclined vertical guide wall having no rectangular corner where the clippings could adhere or stagnate, and are directed toward the center of the mulching chamber to quickly return to the cutting operational area for the rotary blade to realize mulching operations with high mulching efficiency. With this, the plurality of mulching chambers partitioned by the mulching baffle communicate with each other in the boundary regions, and yet the grass clippings are prevented from flowing into the adjacent mulching chamber, which improves mulching efficiency.

The mulching baffle is removable from the mower unit to allow the grass clippings cut by each blade to be collected and discharged en bloc from a discharge outlet formed in the mower deck.

In order to achieve the above-noted object, it is also effective to provide a similar construction to the above in which a starting end guide surface is formed in a starting end portion of the vertical guide wall with respect to a direction of rotation of the rotary blade in a region around the opening, whereby grass clippings are deflected inwardly of the mulching chamber with which the starting end guide surface is associated. More particularly, in this arrangement, the grass clippings swirled by the rotary blade and reaching the opening are returned to the mulching chamber by the action of the starting end surface formed in the starting end of the vertical guide wall, which prevents the clippings from flowing from the mulching chamber through the opening into the adjacent mulching chamber.

As a matter of course, it is preferable to provide both of these two characteristic features, the terminal end surface and starting end surface as set forth above.

According to a further preferred embodiment of the present invention, the inclined vertical guide wall may be formed as a concave surface to provide an enlarged corner space for guiding and swirling the grass clippings. As a result, clogging is restrained from occurring in mowing operations in a dense grass area or high grass area, which provides a good mulching performance.

Since the mulching baffle needs to be removed in a mowing mode other than a mulching mode, it is also important for the mulching mower unit to simplify a removing operation of the baffle.

For example, in time of removing and installing the mulching baffle, when the vertical guide wall is formed over a range defining a small center angle (with respect to the center of the mulching chamber), the corresponding rotary blade may be manually rotated to a position not interfering with the vertical guide wall to be removed. On the other hand, when the vertical guide wall is formed over a range defining a large center angle (with respect to the center of the mulching chamber) in the direction of rotation of the blade, the guide wall to be removed would inevitably interfere with an end of the corresponding rotary blade wherever the blade is rotated. Thus, the rotary blade has to be removed beforehand when the mulching baffle is detached.

If all of the vertical guide walls each corresponding to each of the juxtaposed mulching chambers are formed with a small center angle, it may become possible to bring all the rotary blades to the rotational positions not interfering with the mulching baffle and to detach or install the mulching baffle without removing the rotary blades. However, with such an arrangement, the range of presence of the vertical guide wall in the rotational direction in each mulching chamber becomes small, which produces a wide opening in the boundary region between the adjacent mulching chambers. This reduces independency of each mulching chamber to cause the grass clippings to easily flow out of the mulching chamber, and adversely affects the mulching performance. On the other hand, when either one of the mulching chambers has a vertical guide wall formed over a range defining a large center angle, the opening formed in the boundary region between the corresponding mulching chamber and the adjacent mulching chamber becomes small to enhance independency of each mulching chamber and reduce the adverse effect on the mulching performance.

In order to realize such an arrangement, a mulching mower unit according to a further aspect of the present invention comprises a mower deck having a top plate, a plurality of rotary blades arranged side by side inside the mower deck, a mulching baffle defined to correspond to loci of rotation of the respective rotary blades inside the mower deck to produce at least part of boundary walls of a plurality of mulching chambers, the mulching baffle being detachably attached to the mower deck, and a plurality of vertical guide walls constituting the mulching baffle which are continuously formed in series and directly opposed to the loci of rotation of the respective rotary blades, each of the guide walls having an inclined surface extending progressively upward toward the deck top plate and inward toward the center of rotation of each blade, part of the inclined surface entering the locus of each rotary blade adjacent the deck top plate, wherein one of the plurality of vertical guide walls extends circumferentially of the locus of rotation of the corresponding rotary blade so as to overlap the rotary blade in any rotational positions as viewed from a rotary axis of the blade, and wherein the other of the plurality of vertical guide walls extends circumferentially of the locus of rotation of the corresponding blade so as not to overlap the rotary blade in a predetermined rotational position as viewed from the rotary axis of the blade.

It is particularly preferable that the rotary blades include three blades arranged in juxtaposition, in which only the vertical guide wall associated with the central rotary blade overlaps the corresponding rotary blade in any rotational positions as viewed from the rotary axis of the blade. This provides small openings formed between the central mulching chamber and the opposite adjacent mulching chambers to realize a mower unit of the three-blade type with high mulching performance.

Other features and advantages of the present invention will be apparent from the following detailed description of the preferred embodiments to be taken with reference to the accompanying drawings.

DESCRIPTION OF THE PREFERRED EMBODIMENT

Figure 1:
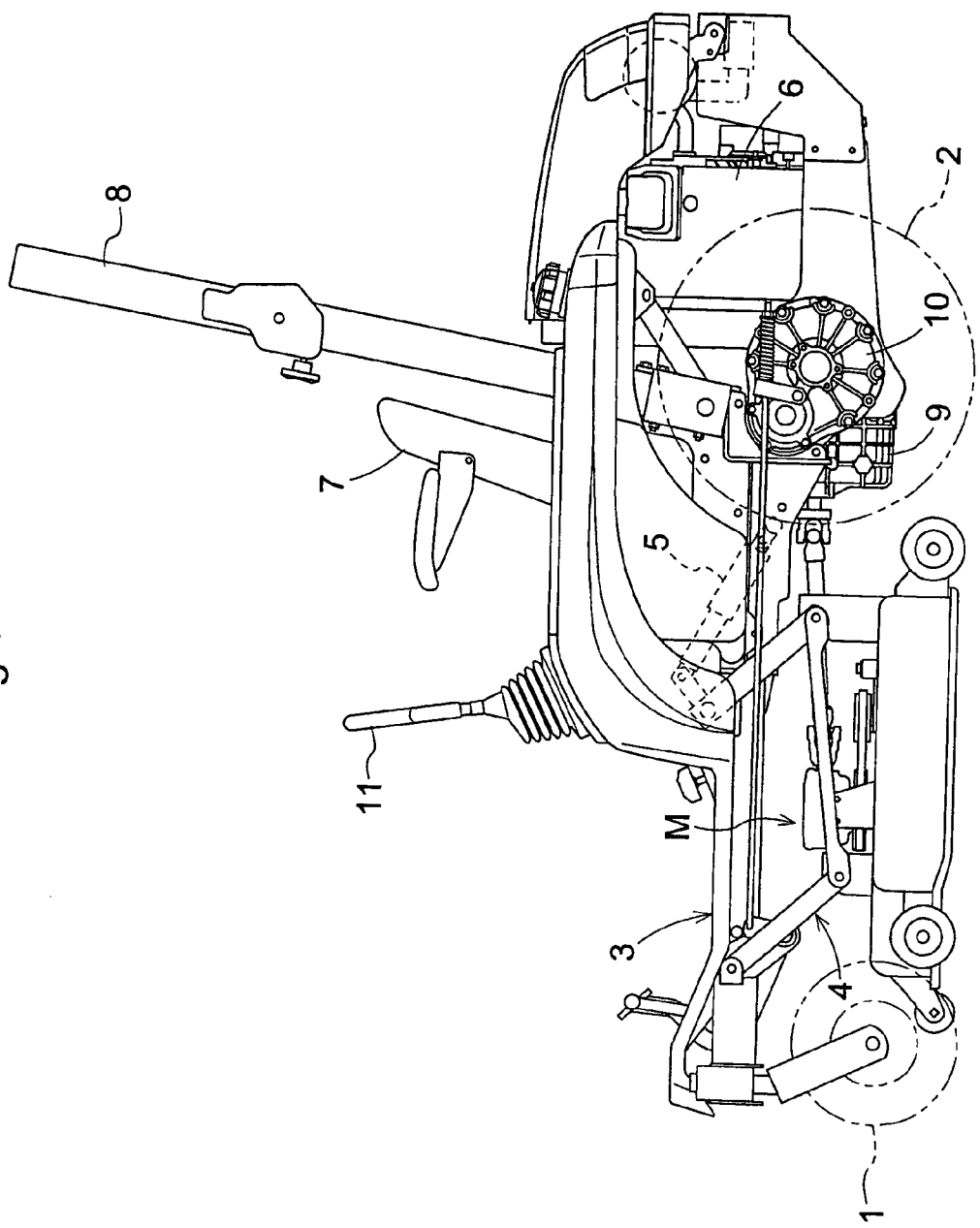
FIG. 1 is a side elevation of a riding-type lawn mower.
Figure 2:
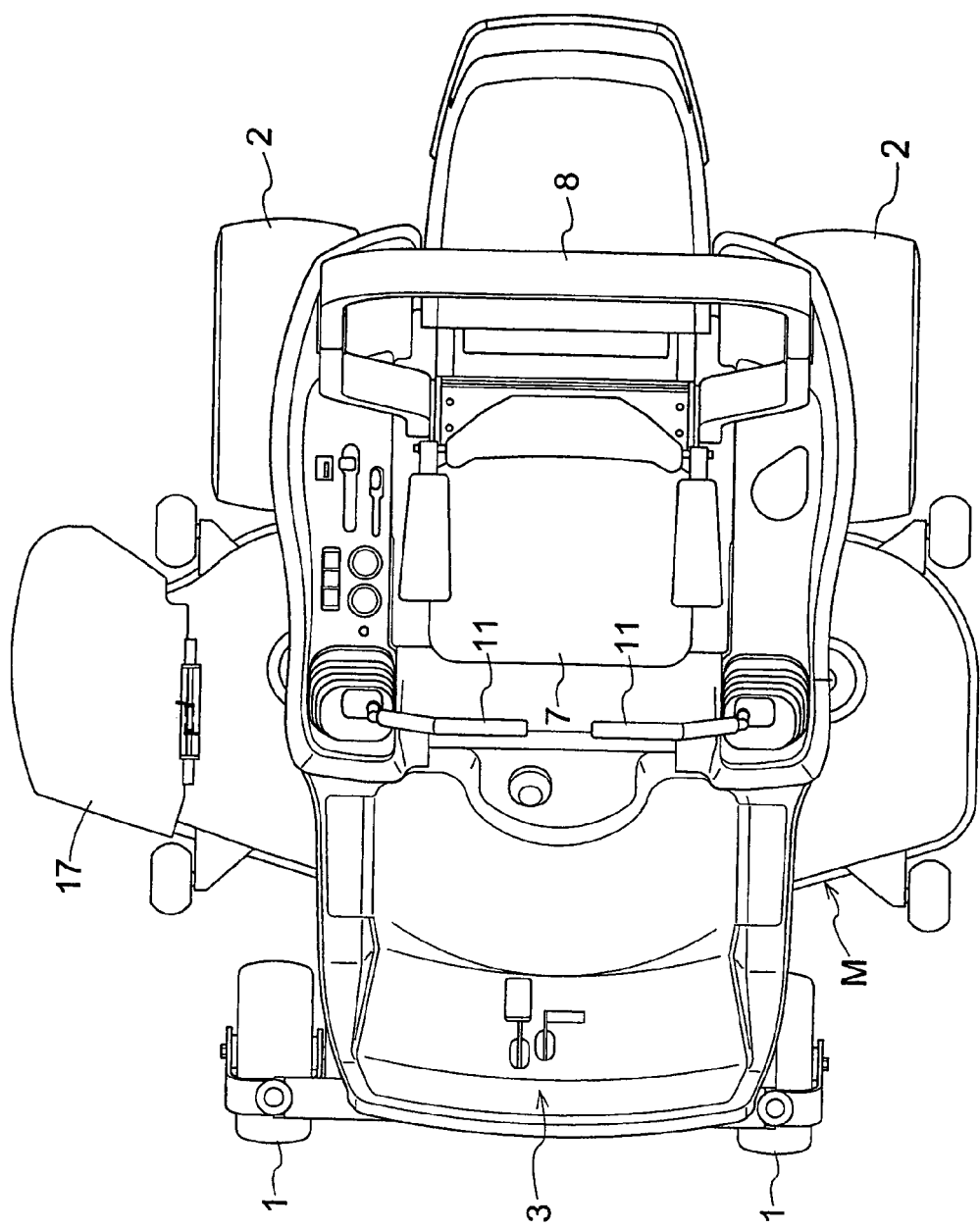
FIG. 2 is a plan view of the riding-type lawn mower.

FIG. 1 and FIG. 2 show a riding-type lawn mower relating to the present invention in side elevation and in plan view, respectively, having a mower unit M attached thereto. The lawn mower includes a vehicle body 3 having a right and left pair of caster-type front wheels 1 and a right and left pair of drive rear wheels 2. The mower unit M is suspended from the underside of the vehicle body 3 between the front and rear wheels through a four-point linkage mechanism 4. The linkage mechanism 4 is vertically movable by a hydraulic cylinder 5 thereby to move the mower unit M vertically and generally horizontally. An engine 6 is mounted rearwardly of the vehicle body 3, and a driver's seat 7 and a gate-shaped rollover protective structure (ROPS) 8 are mounted forwardly of the engine 6.

A detailed description of the vehicle construction is omitted here. Output from the engine 6 is divided into a propelling line and a working line within a housing 9 attached to a lower portion of the vehicle body 3. Power in the propelling line is inputted to an unillustrated right and left pair of hydraulically operable stepless hydrostatic transmissions (HSTs) provided at opposite sides of the housing 9. Power output in varied speeds is transmitted to the right and left rear wheels 2 individually through reduction cases 10.

The stepless hydrostatic transmissions for driving the right and left rear wheels 2 are shiftable by a pair of right and left propelling levers 11 individually which are provided at opposite sides of the driver's seat 7 to be rockable back and forth, thereby to steplessly change forward and rearward speeds of the right and left rear wheels 2 independently. The right and left propelling levers 11 are operable to selectively establish a forward or rearward straight running state, a pivot turn, and a spin turn. The branched drive power for the working line is outputted forwardly from a PTO shaft 12 projecting from a lower front portion of the housing 9 to be transmitted to the mower unit M as described hereinafter.

Figure 3:
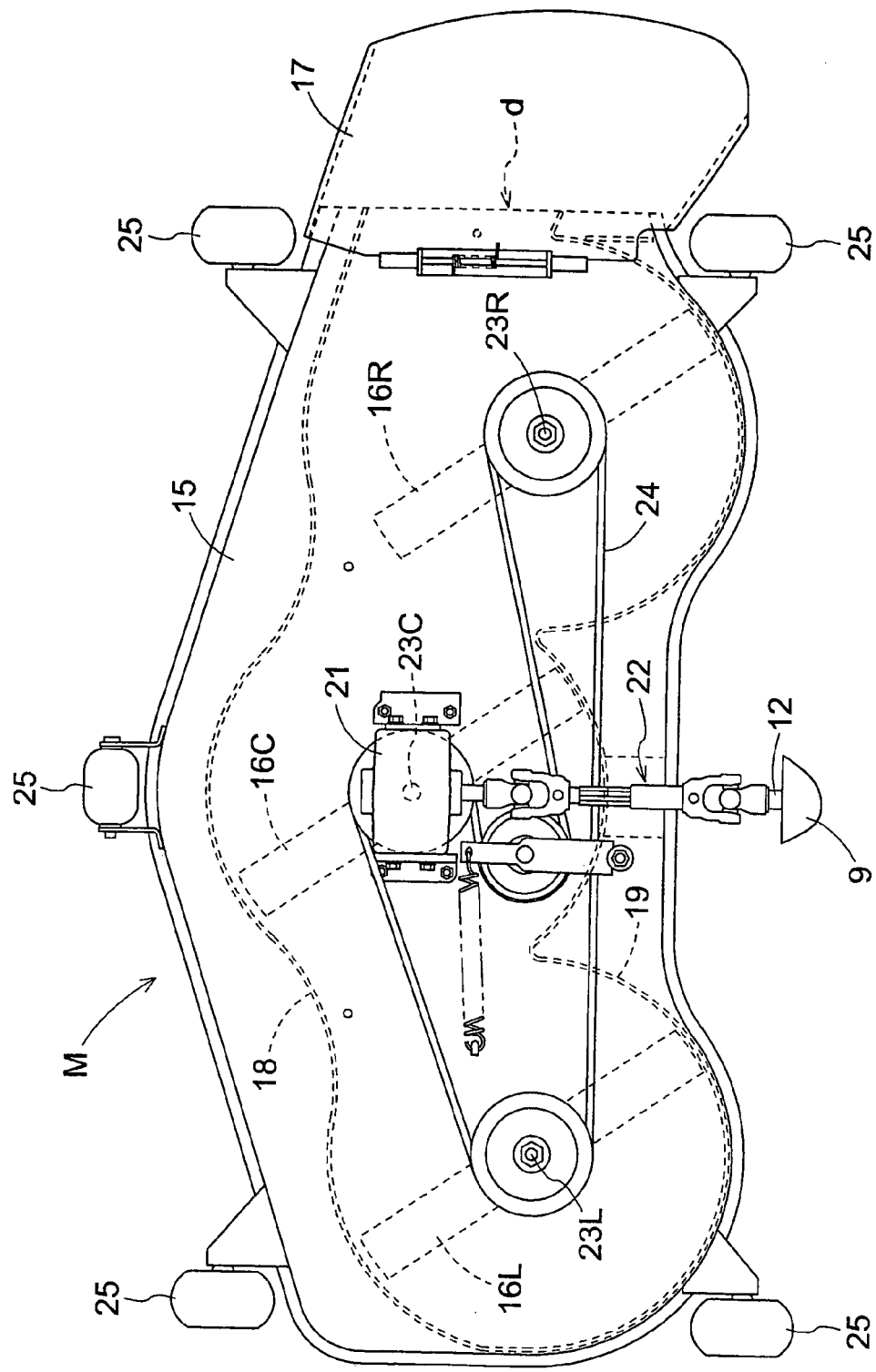
FIG. 3 is a plan view of a mower unit in a side-discharging mode.
Figure 4:
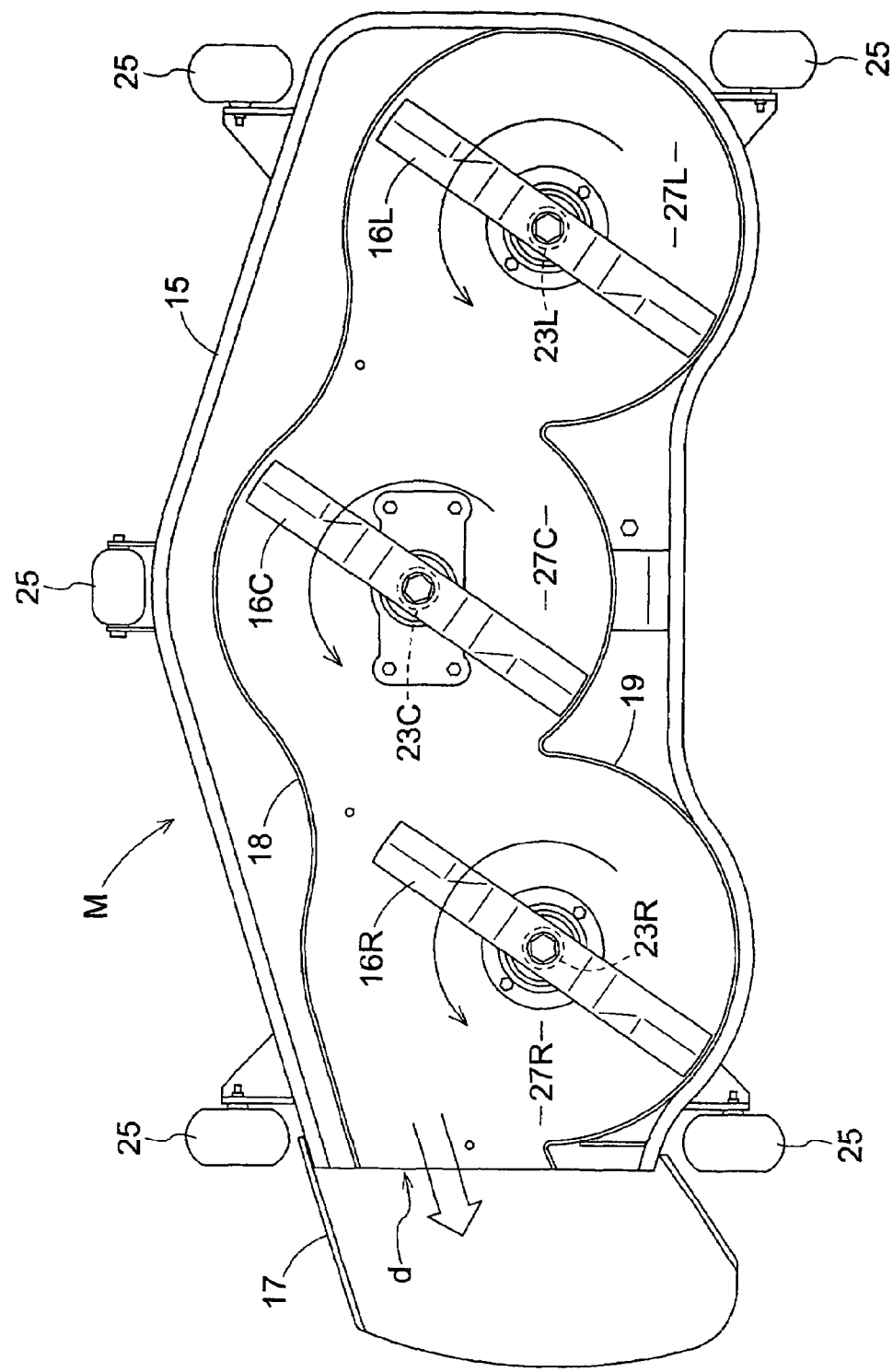
FIG. 4 is a bottom view of the mower unit in the side-discharging mode.

As illustrated in FIGS. 3 and 4, the mower unit M comprises a box-like mower deck 15 opening downward and including three rotary blades 16L, 16C and 16R arranged therein to be rotatable about vertical axes. These blades are in a triangular arrangement in plan view and shaft-supported by the mower deck 15 so that the central rotary blade 16C may be displaced slightly forwardly from the other rotary blades. The mower deck 15 is constructed as a flat deck with an upper wall having a uniform height over the entire deck. A discharge outlet "d" having an anti-scattering outlet cover 17 is formed at a right end portion of the deck.

Fixed within the mower deck 15 are a front vacuum plate 18 gently curved along forward arcuate faces defined by loci of extreme ends of the rotary blades 16L, 16C and 16R, and a rear vacuum plate 19 sharply curved along rearward arcuate faces defined by the loci of the extreme ends of the rotary blades. Mulching chambers associated with the respective rotary blades 16L, 16C and 16R each communicate with the adjacent mulching chamber(s) at boundary regions thereof through large fore-and-aft spaces, thereby to produce a continuous mulching space within the mower deck.

The operating drive power taken from the PTO shaft 12 is transmitted to a bevel gear casing 21 mounted on a central top surface of the mower deck 15 through a flexible and extendible and contractible shaft transmission mechanism 22. The rotary power converted to rotation about a vertical axis in the bevel gear casing 21 is transmitted to a rotary shaft 23C of the central rotary blade 16C. The rotary shaft 23C and rotary shafts 23L and 23R of the right and left rotary blades 16L and 16R are interlocked with each other through a belt 24 wound thereon. All of the rotary blades 16L, 16C and 16R are rotated at equal speed in the same direction (clockwise as viewed from above) so that a resultant of front parts (with respect to a vehicle running direction) of the loci of rotation of the rotary blades 16L, 16C and 16R is directed to the discharge outlet "d". Further, freely rotatable wheels (anti-scalp rollers) 25 are provided around the mower deck 15 for riding obstacles. When a slope or a ridge on the ground approaches the mower unit M suspended by the linkage mechanism 4 with an upward movement allowance, one or more of the freely rotatable wheels 25 rides or ride the ridge or the like to lift the mower unit M relative to the vehicle body, thereby to prevent the mower deck 15 from directly contacting and scraping the ground.

The mower unit M is capable of selecting a mowing operation mode by varying interior specifications thereof between a side-discharging mode for discharging grass clippings from the discharge outlet "d" provided at the right end portion of the deck, and a mulching mode for cutting or chopping the grass clippings into sufficiently small pieces and depositing them on the running track of the mower unit. The mower unit in each mode will be set forth below.

[Side-discharging Mode]

FIG. 3 and FIG. 4 are plan views of the mower unit M in a standard side-discharging mode as viewed from above and below, respectively. In this mode, the grass clippings cut by the rotary blades 16L, 16C and 16R are rapidly transported along a top plate 15a and the front vacuum plate 18 rightward in FIG. 3 and leftward in FIG. 4, thereby to smoothly discharge the clippings from the discharge outlet "d" provided at the right end of the mower deck.

[Mulching Mode]

Figure 5:
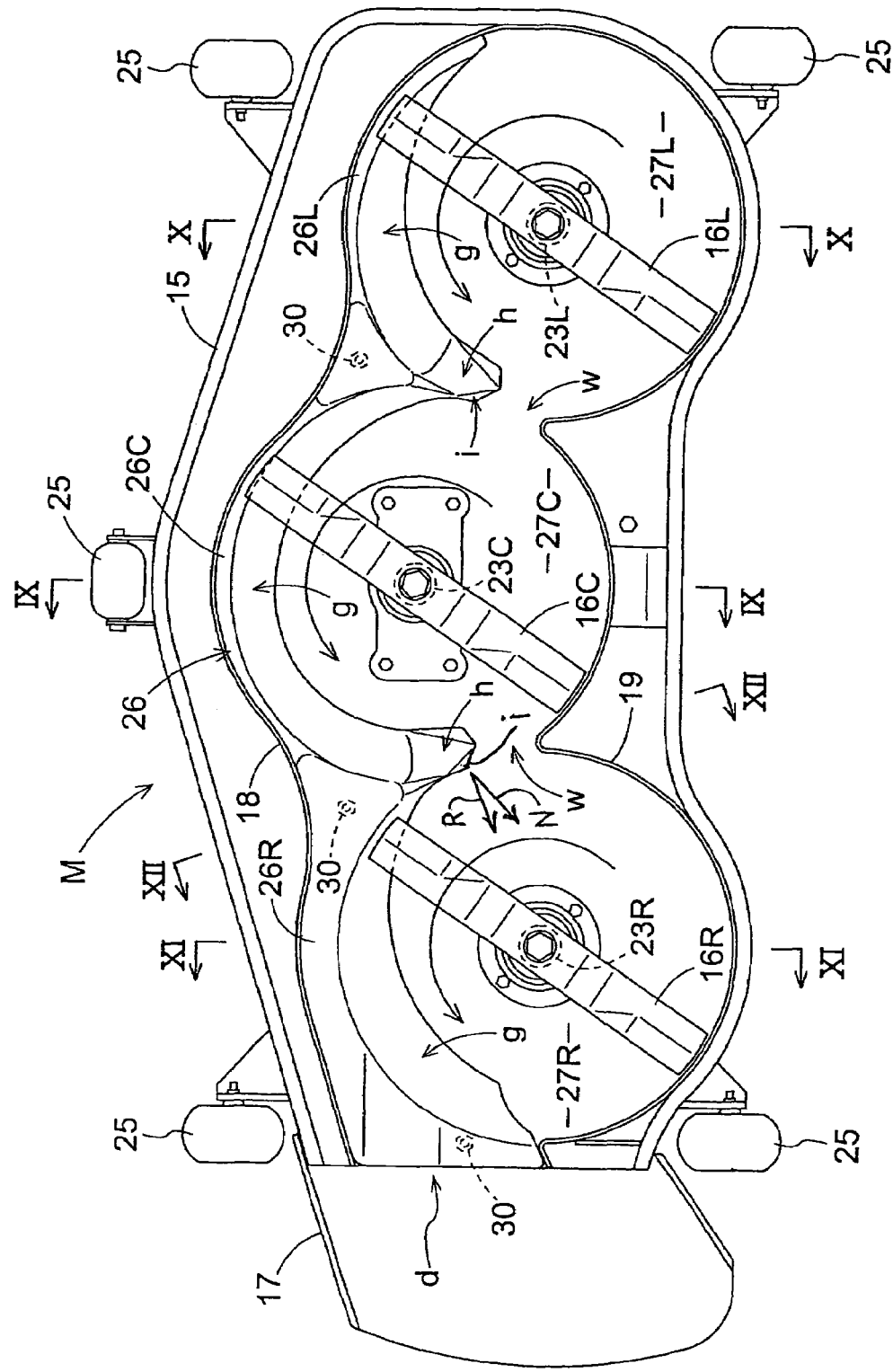
FIG. 5 is a bottom view of the mower unit in a mulching mode.
Figure 6:
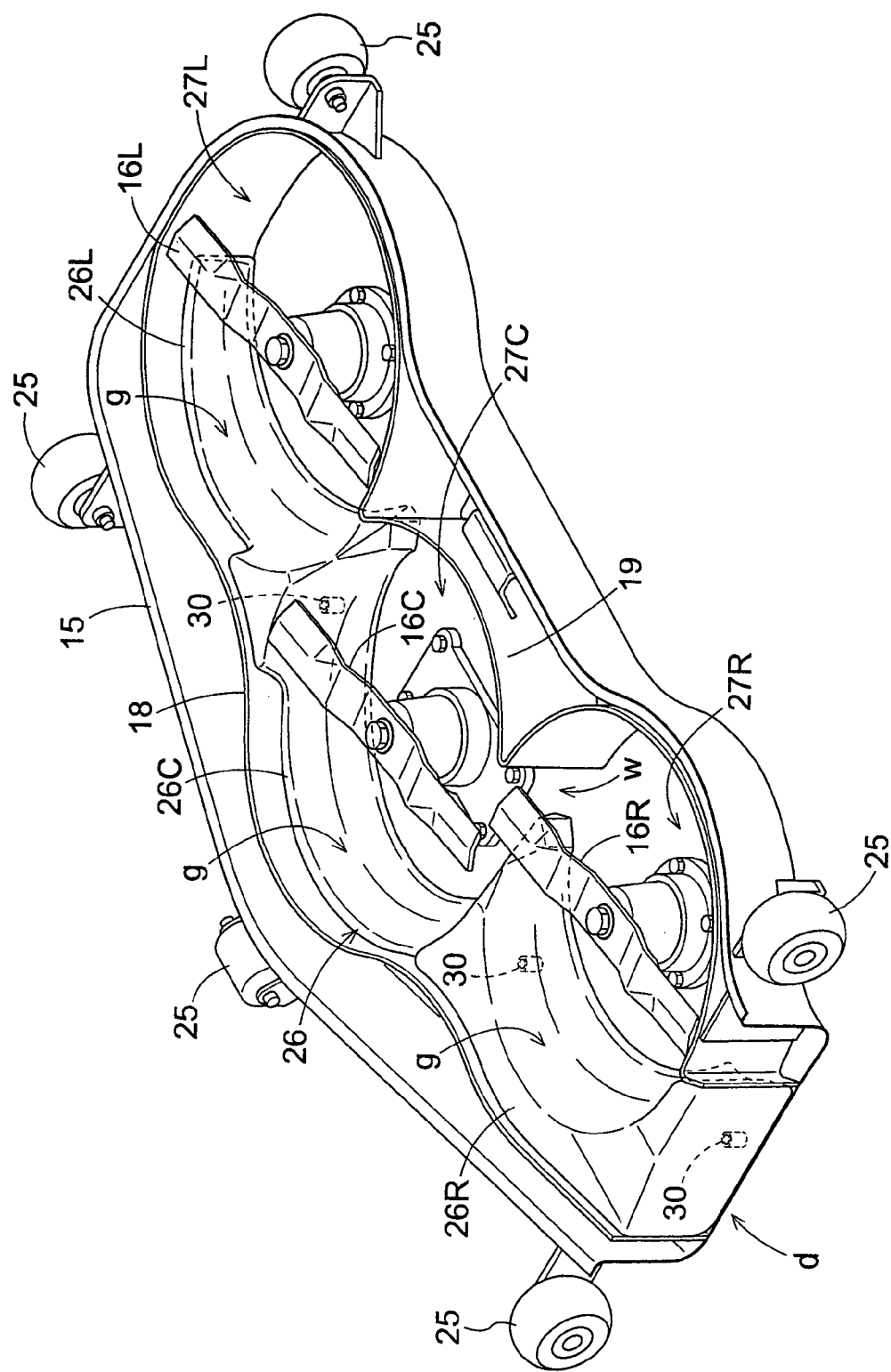
FIG. 6 is a perspective view seen from below of the mower unit in the mulching mode.
Figure 7:
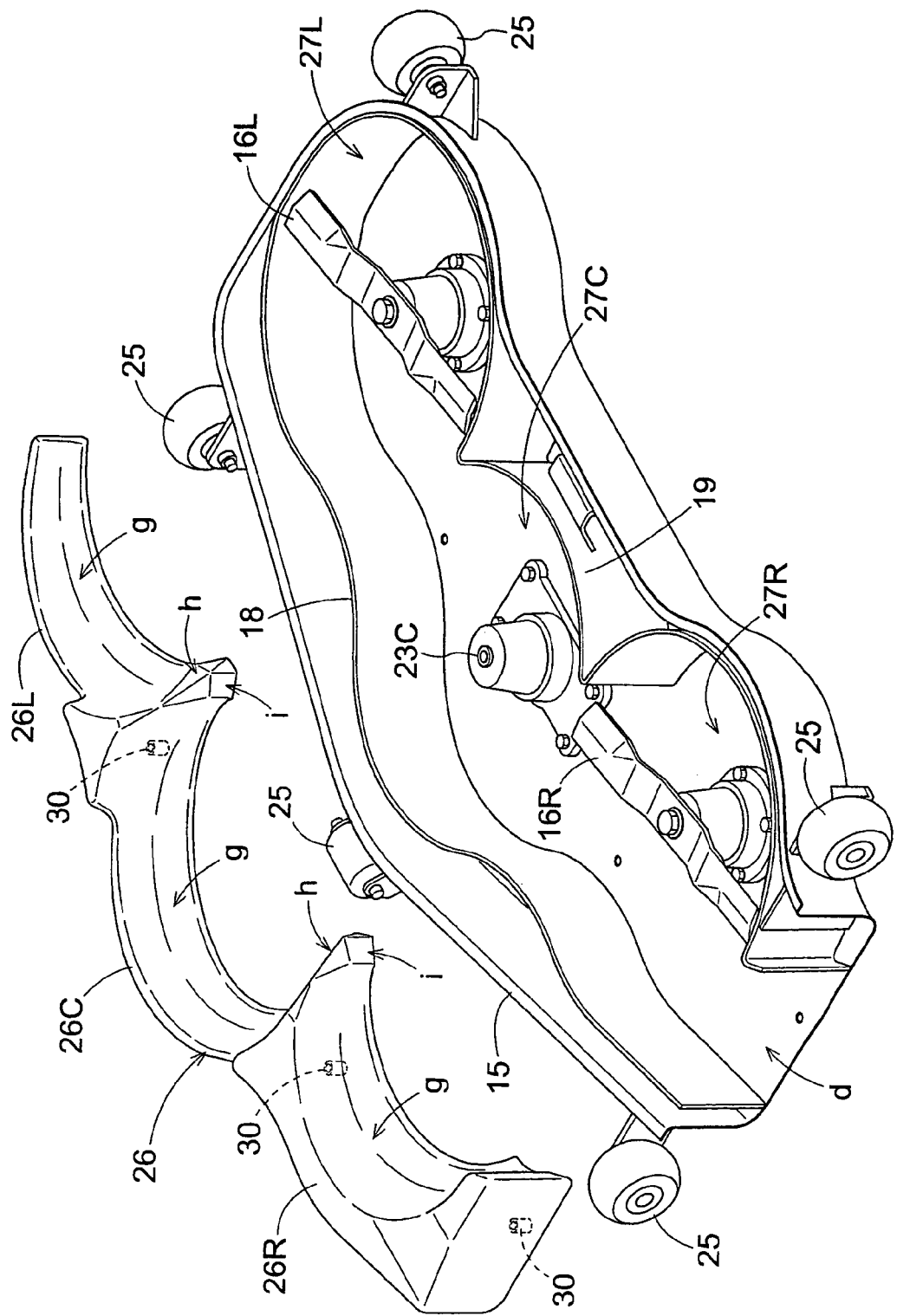
FIG. 7 is an exploded perspective view seen from below of the mower unit in the mulching mode.
Figure 8:
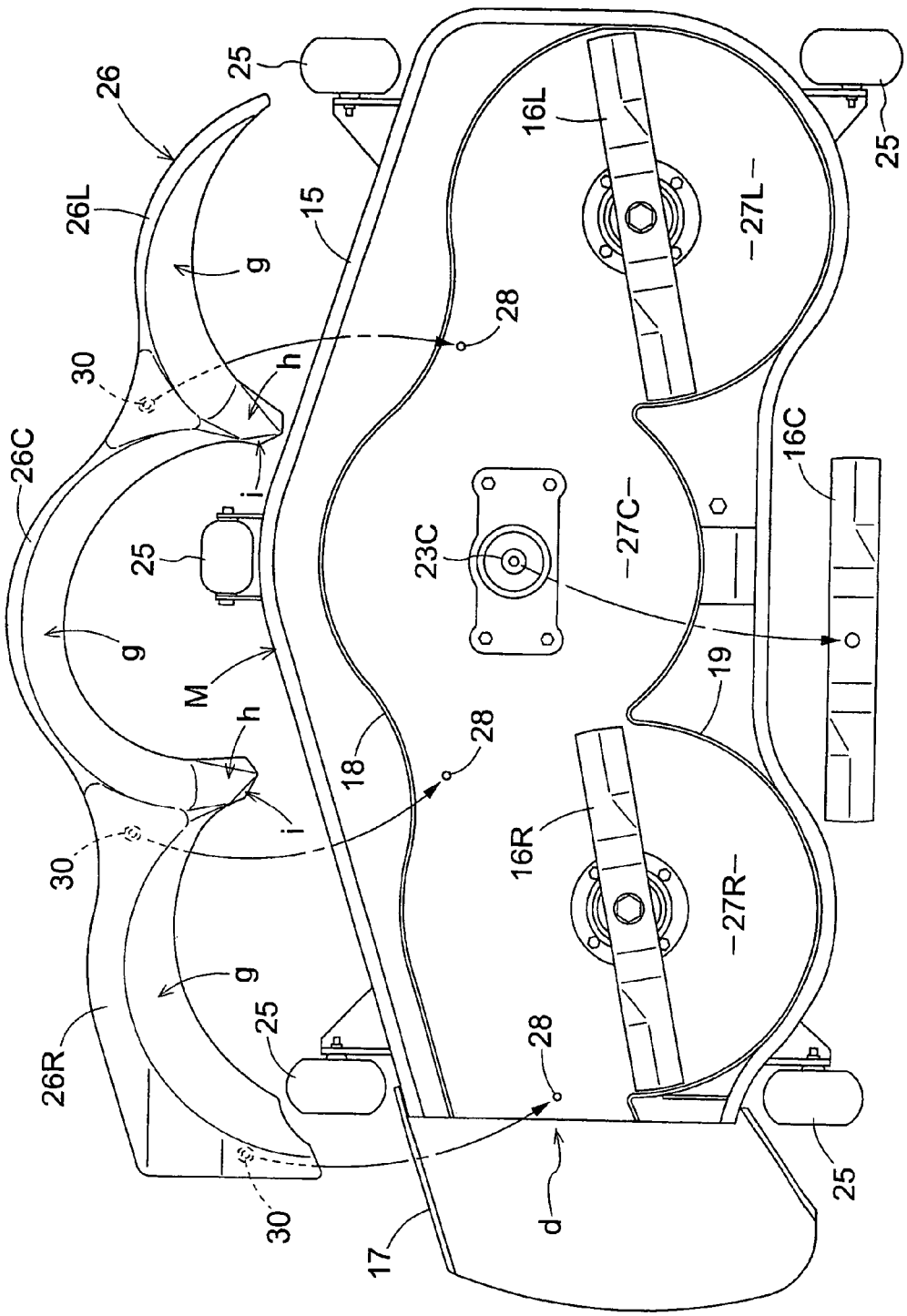
FIG. 8 is an exploded bottom view of the mower unit in the mulching mode.
Figure 9:
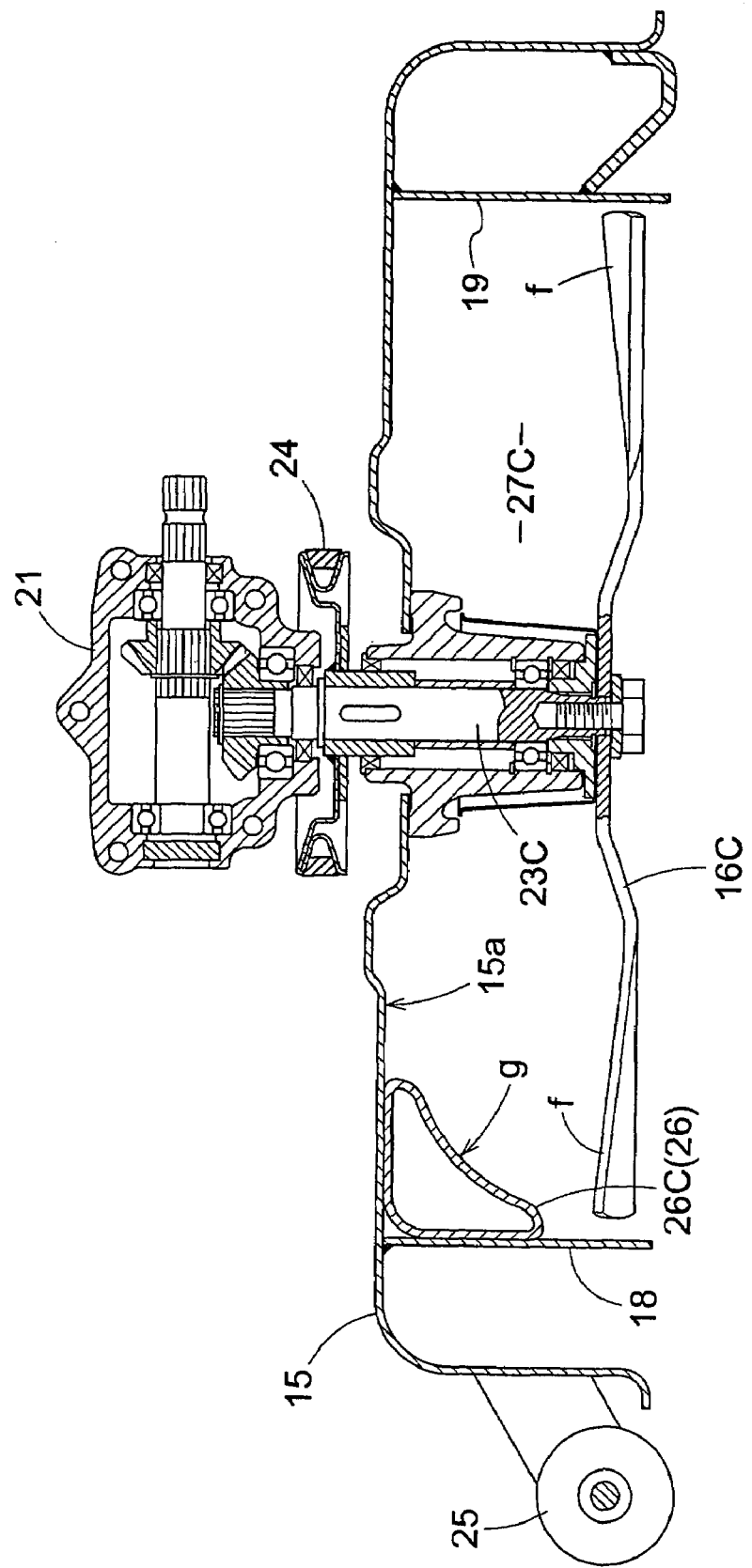
FIG. 9 is a vertical section taken along line IX-IX of FIG. 5.
Figure 10:
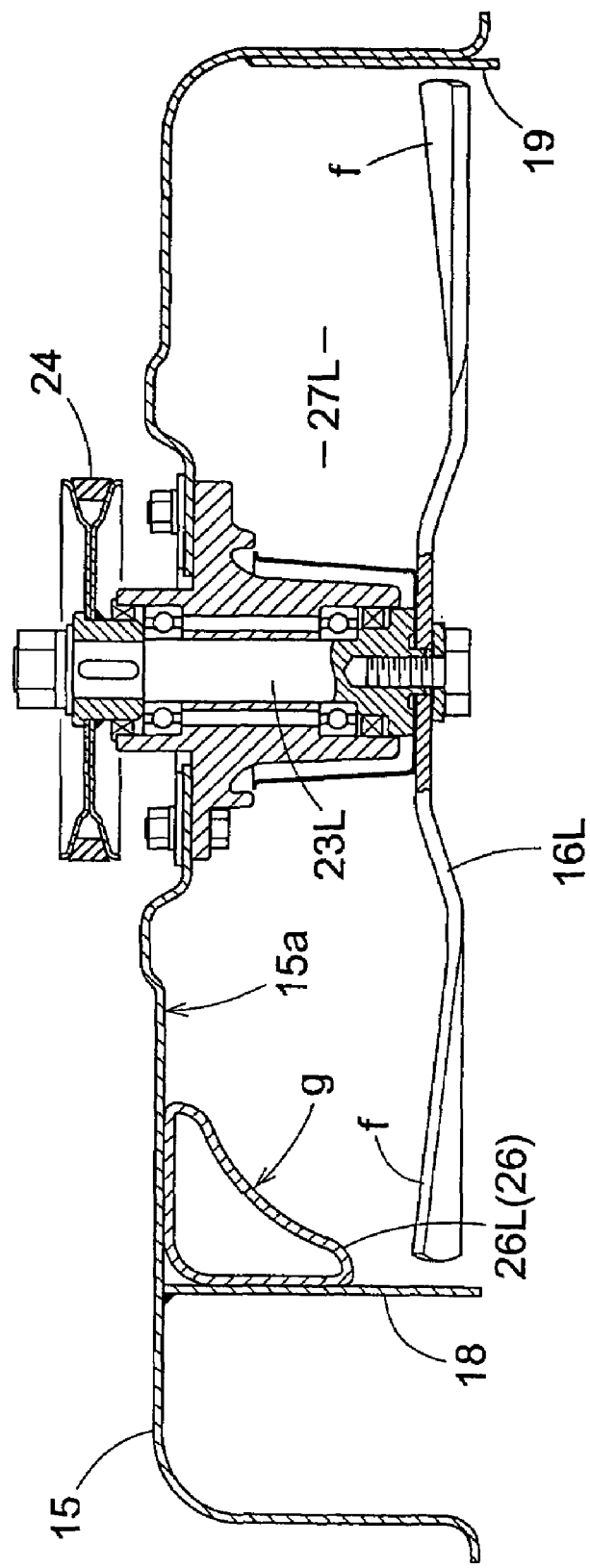
FIG. 10 is a vertical section taken along line X-X of FIG. 5.
Figure 11:
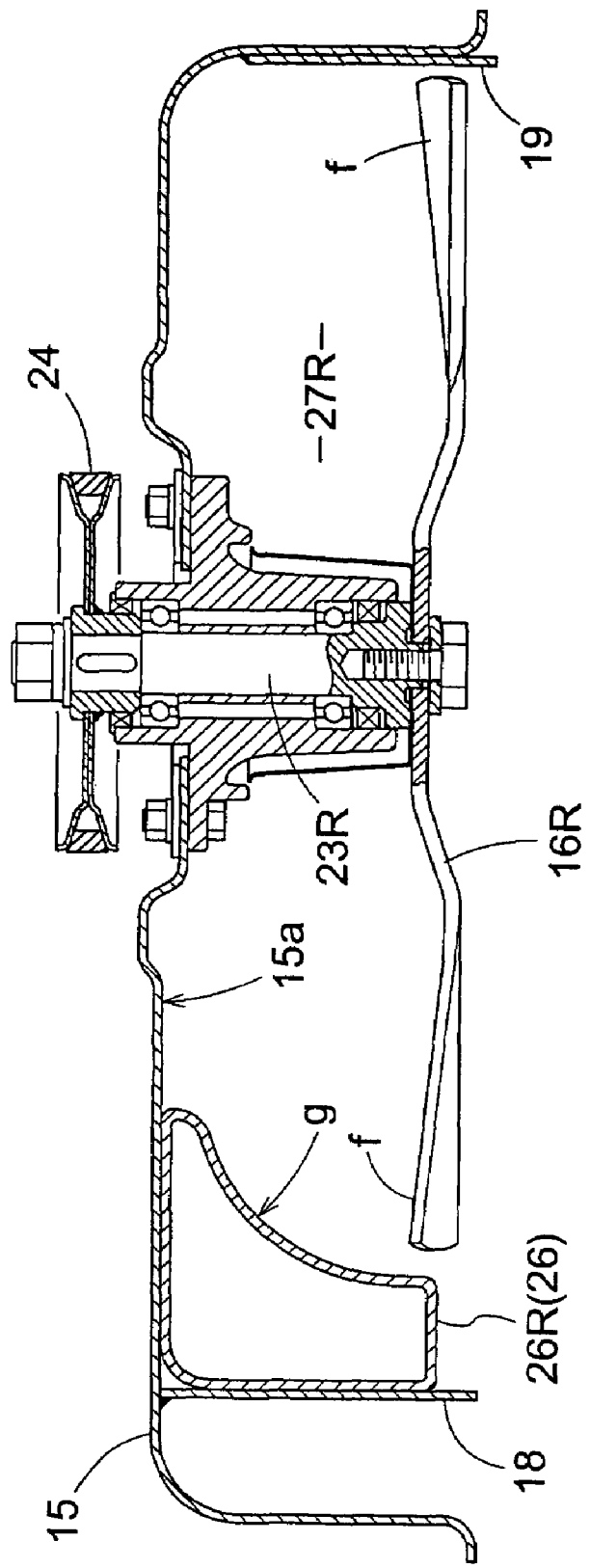
FIG. 11 is a vertical section taken along line XI-XI of FIG. 5.

FIG. 5 and FIG. 6 illustrate the mower unit M in the mulching mode shown in plan view and in perspective view as seen from the bottom, respectively, while FIG. 7 and FIG. 8 illustrate a state where the mower unit M is separated from a mulching baffle 26. FIGS. 9 through 12 are vertical sectional views each showing part of the mower unit M in the mulching mode. In this mulching mode, the hollow mulching baffle 26 formed of a resin material by blow molding is attached along an inner surface of the front vacuum plate 18. The mulching baffle 26 cooperates with the rear vacuum plate 19 to produce generally circular mulching chambers 27L, 27C and 27R for the respective rotary blades, surrounding the loci of rotation of the rotary blades 16L, 16C and 16R generally over the entire circumferences thereof. With this, each rotary blade 16L, 16C or 16R chops the grass clippings repeatedly within each corresponding mulching chamber 27L, 27C or 27R.

Figure 12:
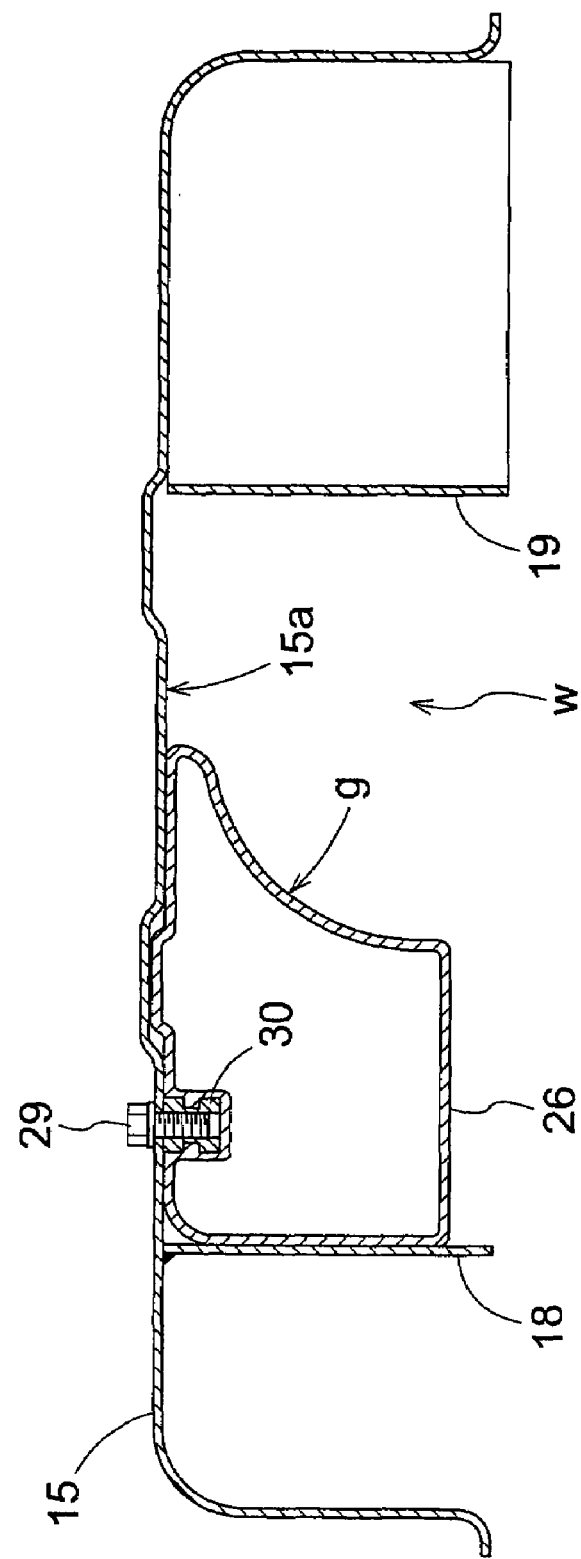
FIG. 12 is a vertical section taken along line XII-XII of FIG. 5.

The plastic mulching baffle 26 includes a first baffle 26L opposed to the front part locus of rotation of the rotary blade (left) 16L, a second baffle 26C opposed to the front part locus of rotation of the rotary blade (center) 16C, and a third baffle 26R closing the discharge outlet "d" and opposed to the front part locus of rotation of the rotary blade (right) 16R, the three baffles being integrally formed in series. As shown in FIGS. 8 and 12, the mulching baffle 26 is pressed against a corner defined by the top plate 15a of the mower deck 15 and the inner surface of the front vacuum plate 18 to be stably and rigidly fixed in a predetermined position by screwing three bolts 29 inserted into connecting bores 28 of the top plate 15a from above to insert nuts 30 provided on a top surface of the baffle.

Each of the first baffle 26L, second baffle 26C and third baffle 26R has an inner surface curved in a generally arcuate form in plan view along the locus of rotation of the extreme end of each rotary blade 16L, 16C or 16R to provide a vertical guide wall "g" for receiving and guiding the grass clippings cut and blown off by bent vanes "f" provided at opposite ends of each rotary blade. The vertical guide wall "g" defines an inclined concave surface extending inward toward the axis of rotation of each blade as it extends upward toward the deck top plate. In this manner, the vertical guide wall "g" is formed on the mulching baffle 26 for each of the mulching chambers 27L, 27C and 27R. As a result, grass clippings cut and blown off by rotation of each rotary blade 16L, 16C or 16R in the corresponding mulching chamber 27L, 27C or 27R will swirl and flow along the vertical guide wall "g". While making the above movement, the grass clippings are directed gradually upward and toward the axis of rotation of the blade by the inclination of the guide wall "g", and eventually fall. Thus, the grass clippings repeatedly undergo mulching action of the rotary blades 16L, 16C and 16R to be cut into small pieces efficiently.

In this arrangement, the vertical guide wall "g" of each of the left-side first baffle 26L and the right-side third baffle 26R in the mulching baffle 26 has an arc dimension so as to define a center angle less than 180 degrees relative to the center of rotation of the blade (substantially the center of the mulching chamber). Thus, the rotary blade 16L or 16R at a predetermined rotating angle does not overlap the vertical guide wall "g" as viewed from the axis of rotation of the blade. On the other hand, the vertical guide wall "g" of the central second baffle 26C has an arc dimension to define a center angle greater than 180 degrees relative to the center of rotation of the blade (substantially the center of the mulching chamber) thereby to allow the rotary blade 16C at any rotating angles to at least partially overlap the vertical guide wall "g" as viewed from the axis of rotation of the blade.

In order to remove or install the mulching baffle 26 having the vertical walls "g" overlapping the loci of the extreme ends of the rotary blades 16L, 16C and 16R as viewed from the axis of rotation of the blade, the right and left blades 16L and 16R are placed in sideways extending posture and only the central rotary blade 16C is removed from the rotary shaft 23C as shown in FIG. 8. Then, the mulching baffle 26 may be removed or set to the predetermined position along the front vacuum plate 18.

The adjacent mulching chambers 27 communicate with each other through an opening "w" having a reduced fore-and-aft dimension in the position where the loci of rotation of the blades come close to each other. With this, mulching performance deteriorates if the grass clippings in one of the mulching chambers pass through the opening "w" and flow into the adjacent mulching chamber. Thus, the following measure is taken on a projection formed in a bridge region between the first baffle 26L and the second baffle 26C and a projection formed in a bridge region between the second baffle 26C and the third baffle 26R to prevent the grass clippings from flowing through the openings "w".

Figure 13:
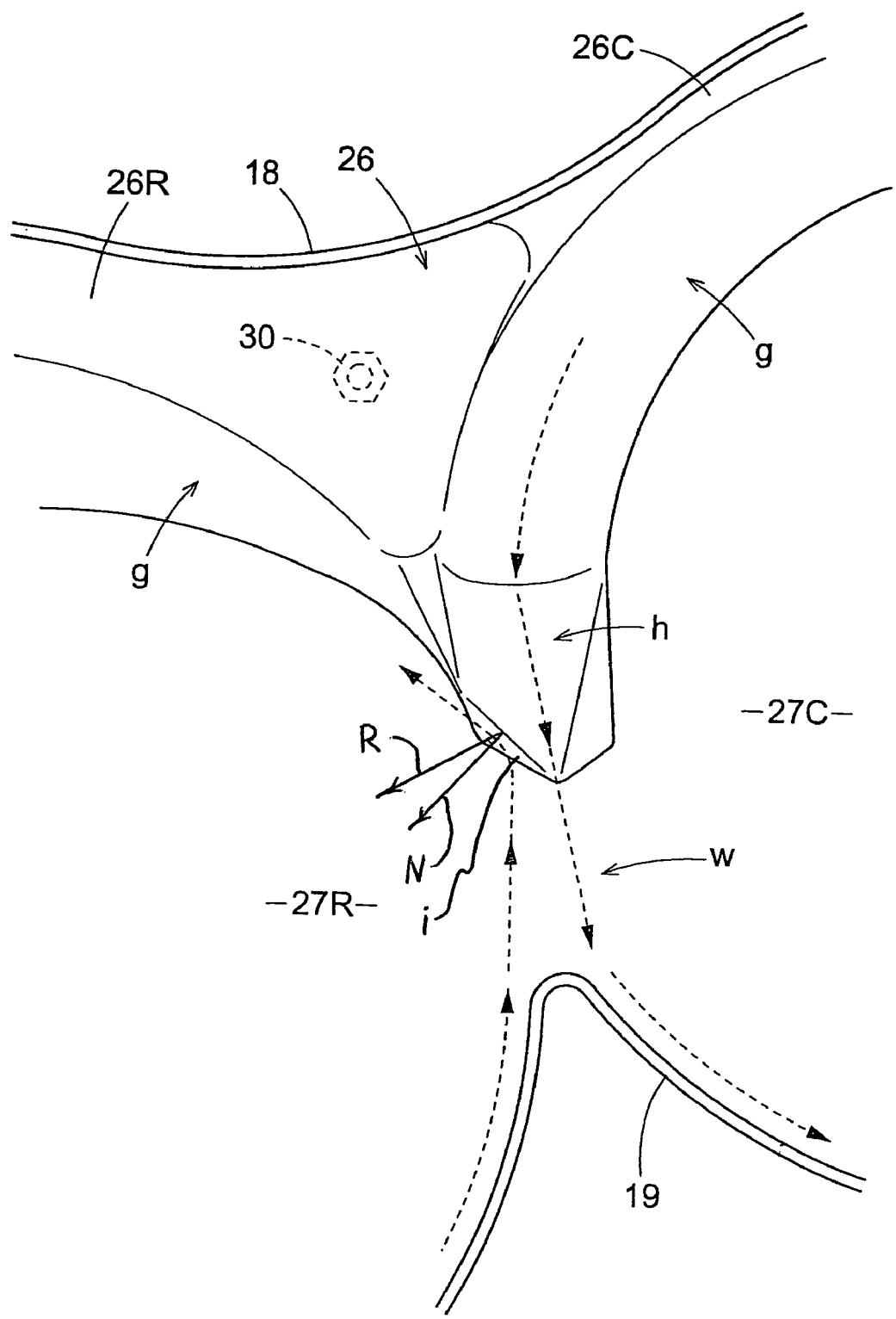
FIG. 13 is a plan view showing a principal portion of a mulching baffle.

As shown in FIG. 13, a terminal end guide surface "h" is formed on an end portion of the vertical guide wall "g" of the second baffle 26C, which end portion is a downstream end with respect to the direction of rotation of the blade. The guide surface "h" is deflected toward the axis of rotation from the direction tangential to the locus of rotation of the rotary blade 16C. The grass clippings flowing and colliding against the terminal end guide surface "h" are bounced off inwardly of the mulching chamber 27C. As a result, the grass clippings swirling and entrained along the vertical guide wall "g" are restrained from flowing toward the opening "w".

For a similar purpose, a starting end guide surface "i" slightly inclined inwardly of the mulching chamber 27R is formed on a starting end portion of the vertical guide wall "g" for the third baffle 26R which is an upstream end portion with respect to the direction of rotation of the blade. In other words, a normal vector N to the starting end guide surface "i" is tilted with respect to a radial direction R in plan view. The grass clippings swirled and entrained by the action of the rotary blade 16R to reach the opening "w" are bounced off inwardly of the mulching chamber 27R by the effect of the starting end guide surface "i" thereby to restrain the clippings from flowing from the mulching chamber 27R into the adjacent mulching chamber 27C.

Although not shown, a terminal end guide surface "h" similar to the above is formed on a terminal end portion of the vertical guide wall "g" for the first baffle 26L with respect to the direction of rotation of the blade, while a staring end guide surface "i" similar to the above is formed on a starting end portion of the vertical guide wall "g" for the second baffle 26C with respect to the direction of rotation of the blade. Hence, the grass clippings are restrained from flowing from the mulching chamber (left) 27L into the mulching chamber (center) 27C, and from the mulching chamber (center) 27C into the mulching chamber (left) 27L.

Other Embodiments

The present invention may be modified in the following ways.

Figure 14:
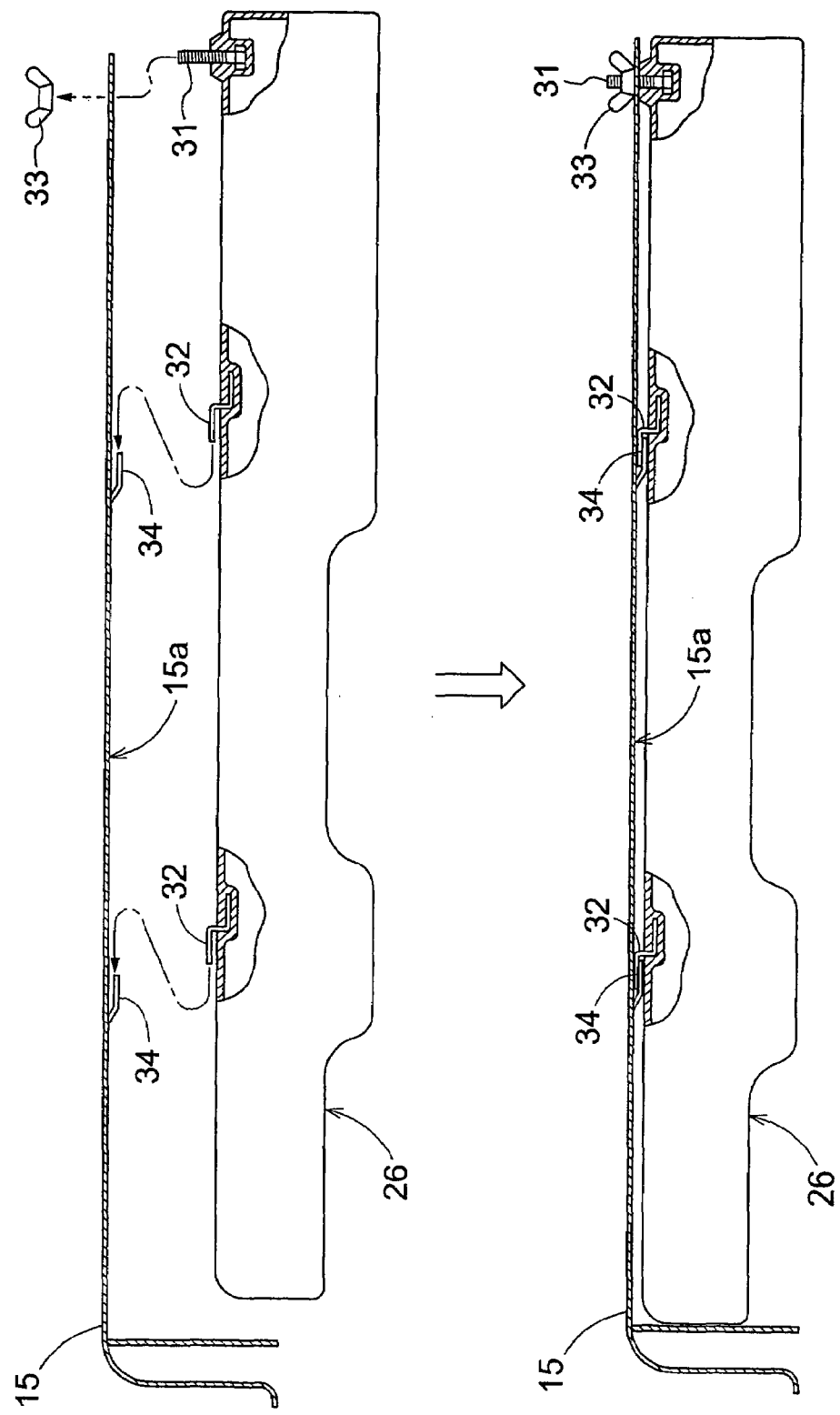
FIG. 14 is a vertical section showing a construction for installing the mulching baffle according to another embodiment of the invention.

(1) As illustrated in FIG. 14, a single bolt 31 and a plurality of hooks 32 are inserted to a top surface of the mulching baffle 26. The bolt 31 extends through a connecting bore 28 formed in the deck top plate 15a to which a wing nut 33 is screwed, while the hooks 32 are engaged with mating hooks 34 formed in the deck top plate 15a by welding or cutting. This allows the mulching baffle 26 to be installed or removed easily without having to use any tools, which is effective in enhancing manipulative efficiency. In addition, since only a single connecting bore 28 is formed in the deck top plate 15a, fine clippings and foreign particles are less often discharged out of the connecting bore 28 in time of operations in the standard discharging mode.

(2) It is also possible to carry out mowing operations in the mulching mode with excellent mulching efficiency by allowing each vertical guide wall "g" provided in the mulching baffle 26 to have a linear inclined contour in vertical section. However, in order to enlarge the corner space for swirling and guiding the cut and blown-off grass clippings thereby to enhance operational performance, it is desirable that the wall has an angular inwardly inclined contour bent with an obtuse angle (boomerang-shaped), or the inclined contour curved inwardly as described above.

(3) It is advantageous in attempting to reduce the weight of the machine that the mulching baffle 26 is made of plastic by blow molding. However, it is also possible to employ a sheet metal mulching baffle made by press working or welding where wear-out or abrasion of the mulching baffle is likely, depending on the type of lawn or soil conditions of the ground.

(4) In the forgoing embodiment, the mower unit M of the three-blade type is described. However, the present invention can be applied to a two-blade type mower unit as well.

(5) The forgoing embodiment illustrates the mower unit M of side-discharging type in which the grass clippings are discharged from the discharge outlet "d" provided at a side end of the deck. However, the present invention can also be applied to a mower unit of rear-discharging type having a discharge outlet provided at the rear of the mower deck.

What is claimed is:

1. A mulching mower unit comprising:
   a mower deck having a top plate;
   a plurality of rotary blades arranged side by side inside the mower deck;
   a mulching baffle and a rear vacuum plate defined to correspond to loci of rotation of the respective rotary blades inside the mower deck to produce at least part of boundary walls of a plurality of mulching chambers, the mulching baffle being attached to the mower deck wherein the mulching baffle and the rear vacuum plate define generally circular mulching chambers for the respective rotary blades and surround the loci of rotation of the rotary blades generally over the entire circumferences thereof;
   a vertical guide wall formed in the mulching baffle and directly opposed to the loci of rotation of the respective rotary blades;
   an opening between the mulching baffle and a forwardly projecting end portion of the rear vacuum plate for allowing the adjacent mulching chambers to communicate with each other; and a terminal end guide surface formed in a terminal end portion of the vertical guide wall with respect to a direction of rotation of the rotary blade in a region around the opening, wherein the terminal end guide surface has a radius less than the loci of rotation and wherein an extension of the terminal end guide surface is directed inwardly with respect to the forwardly projecting end portion of the rear vacuum plate such that grass clippings are deflected inwardly of the mulching chamber with which the terminal end guide surface is associated.

2. A mulching mower unit as claimed in claim 1, wherein the vertical guide wall has an inclined surface extending progressively upward toward the deck top plate and inward toward the center of rotation of each blade, the inclined surface being in the form of a concave surface.

3. A mulching mower unit as claimed in claim 1, wherein the opening spans an angle of approximately 30 degrees or less with respect to a center of rotation of either of the rotary blades that correspond to the opening.

4. A mulching mower unit as claimed in claim 3, wherein the opening spans an angle of approximately 20 degrees or less with respect to a center of rotation of either of the rotary blades that correspond to the opening.

5. A mulching mower unit as claimed in claim 1, wherein the terminal end portion extends to the extent that the terminal end portion reaches an imaginary straight line connecting centers of rotation of the two blades that correspond to the opening.

6. A mulching mower unit comprising:
a mower deck having a top plate;
a plurality of rotary blades arranged side by side inside the mower deck;
a mulching baffle and a rear vacuum plate defined to correspond to loci of rotation of the respective rotary blades inside the mower deck to produce at least part of boundary walls of a plurality of mulching chambers, the mulching baffle being attached to the mower deck wherein the mulching baffle and the rear vacuum plate define generally circular mulching chambers for the respective rotary blades and surround the loci of rotation of the rotary blades generally over the entire circumferences thereof;
a vertical guide wall formed in the mulching baffle and directly opposed to the loci of rotation of the respective rotary blades;
an opening between the mulching baffle and the rear vacuum plate for allowing the adjacent mulching chambers to communicate with each other; and
a starting end guide surface formed in a starting end portion of the vertical guide wall with respect to a direction of rotation of the rotary blade in a region around the opening, wherein a normal vector to the starting end guide surface is tilted with respect to a radial direction in plan view such that grass clippings are deflected inwardly of the mulching chamber with which the starting end guide surface is associated.

7. A mulching mower unit as claimed in claim 6, wherein the vertical guide wall has an inclined surface extending progressively upward toward the deck top plate and inward toward the center of rotation of each blade, the inclined surface being in the form of a concave surface.

8. mulching mower unit as claimed in claim 6, wherein the opening spans an angle of approximately 30 degrees or less with respect to a center of rotation of either of the rotary blades that correspond to the opening.

9. A mulching mower unit as claimed in claim 8, wherein the opening spans an angle of approximately 20 degrees or less with respect to a center of rotation of either of the rotary blades that correspond to the opening.

10. A mulching mower unit as claimed in claim 6, wherein the starting end portion extends to the extent that the starting end portion reaches an imaginary straight line connecting centers of rotation of the two blades that correspond to the opening.

11. mulching mower unit as claimed in claim 6, wherein the rear vacuum plate has a forwardly projecting end portion and the starting end guide surface extends rearwardly toward the forwardly projecting portion of the rear vacuum plat.

12. A mulching mower unit comprising:
a mower deck having a top plate;
a plurality of rotary blades arranged side by side inside the mower deck;
a mulching baffle and a rear vacuum plate defined to correspond to loci of rotation of the respective rotary blades inside the mower deck to produce at least part of boundary walls of a plurality of mulching chambers, the mulching baffle being attached to the mower deck wherein the mulching baffle and the rear vacuum plate define generally circular mulching chambers for the respective rotary blades and surround the loci of rotation of the rotary blades generally over the entire circumferences thereof;
a vertical guide wall formed in the mulching baffle and directly opposed to the loci of rotation of the respective rotary blades;
an opening between the mulching baffle and the rear vacuum plate for allowing the adjacent mulching chambers to communicate with each other;
a terminal end guide surface formed in a terminal end portion of the vertical guide wall with respect to a direction of rotation of the rotary blade in a region around the opening, wherein the terminal end guide surface has a radius less than the loci of rotation so that grass clippings are deflected inwardly of the mulching chamber with which the terminal end guide surface is associated; and
a starting end guide surface formed in a starting end portion of the vertical guide wall with respect to a direction of rotation of the rotary blade in a region around the opening, wherein a normal vector to the starting end guide surface is tilted with respect to a radial direction in plan view such that grass clippings are deflected inwardly of the mulching chamber with which the starting end guide surface is associated.

13. A mulching mower unit as claimed in claim 12, wherein the vertical guide wall has an inclined surface extending progressively upward toward the deck top plate and inward toward the center of rotation of each blade, the inclined surface being in the form of a concave surface.

14. A mulching mower unit as claimed in claim 12, wherein the opening spans an angle of approximately 30 degrees or less with respect to a center of rotation of either of the rotary blades that correspond to the opening.

15. A mulching mower unit as claimed in claim 14, wherein the opening spans an angle of approximately 20 degrees or less with respect to a center of rotation of either of the rotary blades that correspond to the opening.

16. A mulching mower unit as claimed in claim 12, wherein the terminal end portion extends to the extent that the terminal end portion reaches an imaginary straight line connecting centers of rotation of the two blades that correspond to the opening.

17. mulching mower unit as claimed in claim 12, wherein the rear vacuum plate has a forwardly projecting end portion and the starting end guide surface extends rearwardly toward the forwardly projecting portion of the rear vacuum plate.

18. A mulching mower unit comprising:

a mower deck having a top plate;

a plurality of rotary blades arranged side by side inside the mower deck;

a mulching baffle and a rear vacuum plate defined to correspond to loci of rotation of the respective rotary blades inside the mower deck to produce at least part of boundary walls of a plurality of mulching chambers, the mulching baffle being attached to the mower deck wherein the mulching baffle and the rear vacuum plate define generally circular mulching chambers for the respective rotary blades and surround the loci of rotation of the rotary blades generally over the entire circumferences thereof;

a vertical guide wall formed in the mulching baffle and directly opposed to the loci of rotation of the respective rotary blades;

an opening between the mulching baffle and the rear vacuum plate for allowing the adjacent mulching chambers to communicate with each other; and a terminal end guide surface formed in a terminal end portion of the vertical guide wall with respect to a direction of rotation of the rotary blade in a region around the opening, wherein a normal vector to the terminal end guide surface is tilted with respect to a radial direction in plan view such that grass clippings are deflected inwardly of the mulching chamber with which the terminal end guide surface is associated.

* * * * *

UNITED STATES PATENT AND TRADEMARK OFFICE
CERTIFICATE OF CORRECTION

PATENT NO.       : 7,299,613 B2                                    Page 1 of 1
APPLICATION NO.  : 10/787892
DATED            : November 27, 2007
INVENTOR(S)      : Samejima et al.

It is certified that error appears in the above-identified patent and that said Letters Patent is hereby corrected as shown below:

(1)   Column 9, Line 61, Claim 8, "mulching mower" should read -- A mulching mower --

(2)   Column 10, Line 8, Claim 11, "mulching mower" should read -- A mulching mower --

(3)   Column 10, Line 11, Claim 11, "rear vacuum plat." should read -- rear vacuum plate. --

(4)   Column 10, Line 66, Claim 17, "mulching mower" should read -- A mulching mower --

Signed and Sealed this

Twentieth Day of May, 2008

JON W. DUDAS
*Director of the United States Patent and Trademark Office*